Nov. 28, 1961  D. S. PORTER  3,010,865
METHOD OF MAKING ELASTOMERIC WEBS
Filed April 29, 1958  2 Sheets-Sheet 1

3,010,865
METHOD OF MAKING ELASTOMERIC WEBS

Donald S. Porter, Roanoke, Va., assignor to American Viscose Corporation, Philadelphia, Pa., a corporation of Delaware
Filed Apr. 29, 1958, Ser. No. 731,662
2 Claims. (Cl. 156—167)

This invention relates to porous webs formed of elastomeric filaments bonded together in an irregular manner and more particularly to improved methods for producing the same.

In application Serial Number 400,240, filed December 24, 1953, now Patent No. 2,950,752, in the name of Paul C. Watson and Howard O. McMahon, there is described a method of making elastomeric bodies composed of discontinuous fibers which method comprises spraying fibers in a random fashion onto a moving belt to build up a mat or web which is subsequently stripped from the belt in the form of a self-supporting structure. While the method of said application is admirably suited to forming elastomeric webs of a wide variety of materials, it is not suited to the use of rubber latex or silicone resins because such materials cannot be sprayed. Also, the method of said application is not adaptable for forming webs of continuous filaments.

It is an object of the present invention to provide an improved method of making porous elastomeric mats or webs suitable for use as underlays for carpets, in ironing machines, as inner soles for shoes, and other uses wherein a resilient, non-slippery, porous article is desired.

It is a further object of the invention to provide a method of making such webs of continuous elastomeric filaments.

It is a still further object of the invention to provide a method for making elastomeric webs characterized by randomly arranged elastomeric filaments which adhere to one another in overlaying relation.

It is a more particular object of the invention to provide a method for making such webs or mats of filaments formed from aqueous dispersions of elastomers such as rubber latex, silicone resins and such other materials as cannot be readily sprayed.

Other and further objects, features and advantages of the invention will become apparent as the specification proceeds.

Figure 1:
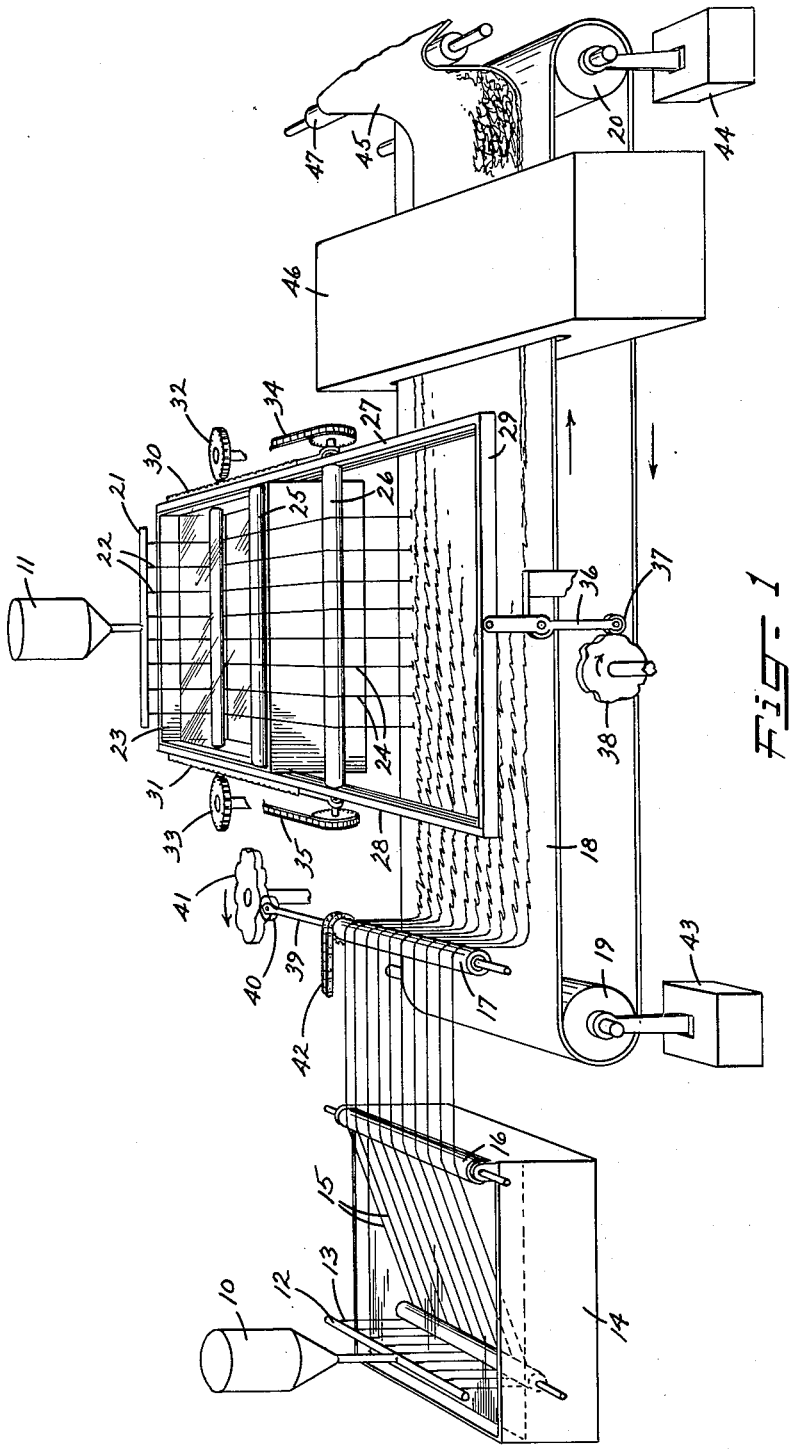
Figure 2:
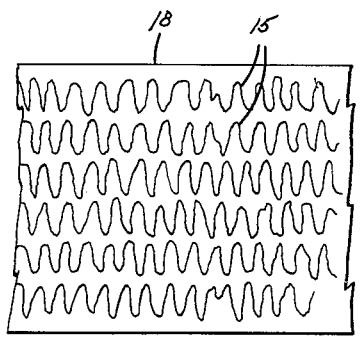
Figure 3:
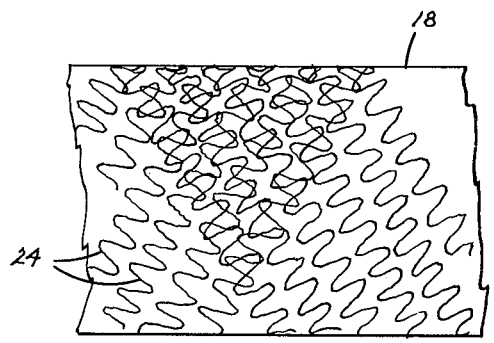
Figure 4:
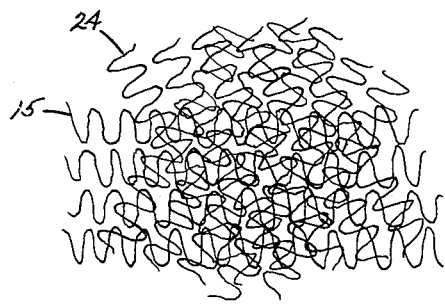
Figure 5:
Figure 6:
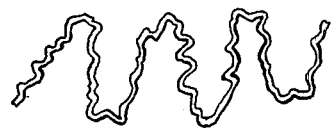

The method of the present invention will be explained in conjunction with the accompanying drawings, wherein:

FIGURE 1 is a representation of one form of apparatus suitable for carrying out the method, FIGURE 2 illustrates a pattern formed by the filaments of one of the groups of filaments employed in practicing the invention, FIGURE 3 illustrates a pattern formed by another group of filaments, FIGURE 4 illustrates one form of random pattern of the filaments in the finished web, FIGURE 5 is a cross-sectional view of the web formed by the method of the present invention, and FIGURE 6 represents a length of an individual filament and shows its irregular pattern.

In general, the invention contemplates the extrusion of an elastomeric material through a plurality of orifices to form a plurality of elastomeric threads or filaments. The newly formed filaments while still in a tacky or sticky condition so that they adhere to one another when brought into contact are deposited in a random overlapping upon a surface to which they will not adhere or, at best, will adhere only slightly. The surface on which the filaments are deposited is preferably a continuously moving belt, so that after the filaments are dropped thereon directly from extrusion orifices or from suitable guides, the mat or web formed by the overlapping filaments is moved beyond the point of deposit of the filaments and is led into a curing or vulcanizing chamber after passing through which the web may be stripped from the traveling belt. In order to arrange the filaments in a random fashion, the invention contemplates dividing the filaments into two groups each of which consists of a line of closely spaced filaments, one of the lines depositing its filaments in an irregular array generally in the direction of movement of the belt and the other line of filaments being moved back and forth across the belt and simultaneously moved in an irregular manner lengthwise of the line of filaments so that the second group of filaments are laid over the first group of filaments generally crosswise thereof but in a substantially random fashion so that the web formed of the two sets of filaments has its components randomly arranged. In order to further enhance the random arrangement of the filaments, the belt itself may be vibrated or otherwise be given a motion transversely of its direction of movement. If the filaments are formed of an elastomeric material dissolved in a solvent, the web may be passed through a heating chamber to evaporate the solvent and then subsequently cured or vulcanized before being stripped from the belt.

The elastomer may be a natural or synthetic polymer such, for example, as rubber latex, smoked gum rubber, crepe rubber, neoprene, halogenated rubbers, butadiene-acrylonitrile copolymers known as Buna-N; for example, Butaprene, Paracril, Ameripol-D, or Perbunan; butadiene styrene copolymers, for example, Ameripol-F, Hycar-OS and GR-S; isoprene-isobutylene copolymers, for example, GR-I and butyl; and organic polysulfides, for example, Thiokol. In a preferred embodiment there is used silicone elastomers because these elastomers have resistance to high temperature. Mixtures of specific elastomeric materials may be utilized to provide desired characteristics. The specific elastomers are enumerated merely for illustrative purposes and it will be understood that the invention is applicable to any elastomeric composition which may be extruded through an orifice to form a continuous filament.

The elastomer may be dissolved in a suitable volatile organic solvent to make an organisol or may be compounded with plasticizers to make a plastisol in which event the filaments may be formed by dry spinning methods and allowed to drop directly on the surface on which the web is to be formed.

When the composition used for forming the filaments is an aqueous dispersion of elastomers such as rubber latex, the filaments may be coagulated in a conventional acid bath or may be coagulated by means of heat and the thus formed filaments are then led from the acid bath or from a heating chamber and passed in groups over suitable guide bars from which the individual filaments are allowed to drop on to the surface of the belt while still in a tacky condition.

The properties and characteristics of the filaments may be varied as desired by incorporating additives into the elastomeric composition from which the filaments are formed. Substances such as normally employed in preparing finished rubber articles from crude natural rubbers or synthetic rubbers may be added, for example, carbon black, curing or vulcanizing agents such as sulfur, accelerators, anti-oxidants, plasticizers and the like. Coloring agents such as dyes and pigments may be utilized to produce filaments having desired colors or tints. Abrasive particles such as emery dust, Carborundum, silica, etc., may be incorporated to provide products having abrasive properties. Hollow filaments may be produced by incorporating gas forming agents such as ammonium carbonate, sodium acetate carbonate, diazoaminobenzene and the like to the spinning solution. The additive substances may be mixed with the elastomer as by milling the elastomer and the additive or the additive substance may be mixed with or dispersed in the solution of the elastomer.

For carrying out the hereinbefore briefly described method of the present invention, an apparatus similar to that shown diagrammatically in FIGURE 1 may be employed. The elastomeric composition, for example, rubber latex, is contained in two tanks 10 and 11. The composition in tank 10 is forced under pressure through a header 12 provided with a plurality of spaced orifices positioned in branches 13 through which the composition is extruded into an acid bath contained in a tank 14 to form a multiplicity of continuous elastomeric filaments 15, said filaments being guided from the tank 14 over a pair of rollers 16 and 17 from the latter of which they are allowed to fall while still in a tacky condition onto a continuous belt 18. The belt 18 is carried by a pair of rollers 19 and 20 and is continuously driven in the direction indicated by the arrows.

The composition in the tank 11 is forced under pressure through a header 21 from which it is extruded through a plurality of orifices provided in branches 22 into an acid bath provided in a tank 23 which coagulates the liquid solutions into a multiplicity of elastomeric filaments 24. The filaments 24 are led from the acid bath over a pair of guide rollers 25 and 26 from the latter of which they fall downwardly upon the moving belt 18.

The roller 26 is mounted in guides 27 and 28 which are tied together by a cross member 29. A pair of racks 30 and 31 are slidably mounted in the guide members 27 and 28 and the shaft carrying the roller 26 is journaled in bearings provided in the forward ends of these racks. Pinions 32 and 33 drive the racks alternately back and fourth to cause the roller 26 carrying the filaments 24 to move back and forth across the surface of the moving belt 18. Sufficient slack should be provided in the filaments between the guide rollers 25 and 26 so that said filaments will not be strained as the roller 26 moves to the edge of the belt 18 remote from the guide roller 25. In order to feed the filaments over the roller 26 and down onto the moving belt, the shaft carrying said roller is provided at its ends with sprocket wheels which may be driven as by means of chains 34 and 35.

With the mechanism thus far described the filaments 24 would be laid upon the belt 18, or upon the filaments 15 previously deposited on said belt, in straight lines extending diagonally across the belt, the diagonal arrangement being caused by the fact that the surface of the belt is continuously moving from left to right as viewed in the figure. However, it is desired that the filaments 24 be randomly arranged and in order to accomplish this the filaments 24 are moved back and forth in an irregular manner in the direction of movement of the belt. This may be accomplished by means of a pivotally mounted lever 36 which is pivoted at one end to the cross member 29 and is provided at its other end with a cam follower roller 37 in engagement with the irregular surface of a continuously rotated cam 38. The irregular pattern formed by the filaments 24 as they drop upon the belt 18 is indicated in FIGURE 3.

While the lines formed by the filaments 15 upon the belt 18 will of course extend generally lengthwise of said belt, it is desired that these filaments also be laid upon the belt in an irregular configuration and in order to accomplish this the shaft 39 upon which roller 17 is rotatably mounted is provided at one end with a follower 40 in engagement with the irregular surface of a continuously rotating cam 41 which causes the roller 17 and consequently the filaments 15 to move back and forth with an irregular motion so that said filaments are dropped upon the belt 18 to form an irregular pattern as indicated in FIGURE 2. The roller 17 may be driven by means of a chain drive 42.

FIGURE 4 shows the general configuration of the surface of the web produced by the overlapping of the two sets of filaments and FIGURE 5 shows the web or mat in cross-section.

While the cams 38 and 41 have irregular configurations, they nevertheless cause their associated sets of filaments to be deposited on the belt in a generally sinusoidal manner and in order to further enhance the random arrangement of the filaments the belt 18 may be caused to vibrate or otherwise move in a direction transverse of its feeding direction. Such vibration can be produced by means of magnetic vibrators 43 and 44, the vibrating elements of which may be connected to the shafts supporting the rollers 19 and 20. The vibrating of the belt causes a pronounced irregularity in the lengthwise direction of each filament as is illustrated in FIGURE 6. Of course the belt could be given some other form of transverse motion which would enhance the irregularity of the pattern formed by the filaments.

As previously mentioned, the elastomeric filaments are in a tacky condition at the time they are laid down upon the belt and upon each other and for that reason they adhere to one another wherever they come into contact and thus is produced a mat or web 45. By varying the speed of back and forth movement of the guide roller 26 with respect to the speed of the belt, the thickness of the web may be controlled within limits. A web of increased thickness may also be provided by having additional sets of filaments such as the filaments 24 deposited on it at a point further along in the travel of the surface of the belt 18.

The belt should be formed of a material to which the filaments will have no tendency to adhere permanently. Suitable materials for forming the belt when the filaments are formed from natural or synthetic rubbers are textile fabrics coated with hydrophilic film-forming colloids such as, for example, regenerated cellulose, water-soluble cellulose ethers and water-soluble polyvinyl alcohol, or a fabric coated with Teflon polymer, or the belt may be formed of metal such as stainless steel either in the form of fine mesh or flat sheeting.

After all the filaments are deposited that are going to be deposited, the web is carried by the belt 18 through a curing or vulcanizing chamber 46 after which the web is stripped from the belt as by passing the web over a roller 47. Prior to curing, the web may be gone over with a roller or the like to flatten or smooth it if desired.

While the drawing illustrates the filaments as being coagulated in an acid bath, it is, as previously mentioned, entirely possible when using aqueous dispersions of elastomers to coagulate the filaments by means of heat and thus the particular coagulating medium is not of the essence of this invention. It has also been mentioned that the filaments may be formed by the extrusion of elastomeric polymers dissolved in suitable volatile organic solvents and in that event the filaments may be extruded directly onto the belt 18 in which case suitable means may be provided to free or drive off the solvent from the elastomeric web.

It has been mentioned that the apparatus is illustrated diagrammatically and it is to be understood that the various elements shown for producing the irregular motions of the filaments could take a wide variety of forms. In fact, the apparatus as a whole could be considerably different from the form shown and the method of this invention could even be carried out in large part by hand.

Before curing or vulcanizing, the freshly formed filaments of elastomeric material are inherently tacky, and after curing are potentially adhesive, that is, they may be rendered tacky or cementitious by some treatment as by the application of a solvent. While the filaments are in a tacky condition it is practicable to introduce between the layers of filaments other materials which will give the web various specific characteristics as may be desired.

These other materials may be pre-formed fibers or filaments or discrete particles of a non-adhesive, non-elastomeric material.

Relatively thick bodies or structures may be produced by a laminating technique, for example prior to vulcanization the web may be stripped from the conveyor belt and folded upon itself to provide the desired thickness. Alternatively, the unvulcanized web may be cut to a desired size and a plurality of such cut webs assembled. Other materials may be introduced between the assembled layers depending upon the characteristics desired in the final product.

While products of a rather wide variety may be produced by practicing the method of this invention, it is characteristic of the method that the product will be comprised of elastomeric filaments bonded together in a random arrangement.

Having thus described the invention, what is claimed is:

1. A process for producing a porous web formed of elastomeric filaments bonded together in an irregular manner comprising extruding an elastomeric composition through a plurality of orifices into a coagulating medium to form a multiplicity of elastomeric filaments, arranging the newly formed filaments while still in a tacky condition into two rows extending at substantially right angles to one another, moving a conveyor belt having a surface to which the filaments will not adhere beneath the filaments so that one of the rows of filaments will be deposited upon said conveyor belt substantially longitudinally thereof, moving the other row of filaments back and forth across the belt so as to deposit those filaments substantially transversely thereof, continuously moving each row of filaments back and forth lengthwise at a point closely above the belt so that the filaments drop onto the belt in irregularly tortuous paths, vibrating the belt transversely of its direction of movement so as to further disrupt the linear arrangement of the filaments as they are deposited thereon, curing the thus deposited web of filaments, and stripping said web en masse from said belt.

2. The method of making a fibrous abrasive material comprising extruding a fiber-forming elastomeric composition containing abrasive particles through a multiplicity of orifices into a liquid coagulating medium to form a multiplicity of continuous fibers, depositing said fibers while still in a tacky condition in a random overlapping fashion upon a moving surface to which said fibers will not adhere to thus form a porous web of bonded together fibers each of which contains abrasive particles embedded therein, curing said porous web, and stripping said web from the moving surface.

References Cited in the file of this patent

UNITED STATES PATENTS

| | | |
|---|---|---|
| 692,467 | Mugnier | Feb. 4, 1902 |
| 1,834,556 | Toles | Dec. 1, 1931 |
| 2,284,715 | Benner et al. | June 2, 1942 |
| 2,284,739 | Hurst | June 2, 1942 |
| 2,328,998 | Radford | Sept. 7, 1943 |
| 2,334,572 | Melton et al. | Nov. 16, 1943 |
| 2,577,214 | Slayter | Dec. 4, 1951 |
| 2,672,910 | Corson | Mar. 23, 1954 |
| 2,678,676 | Slovin | May 18, 1954 |
| 2,738,298 | David et al. | Mar. 13, 1956 |

FOREIGN PATENTS

| | | |
|---|---|---|
| 17,549 | Great Britain | Aug. 15, 1898 |